(12) United States Patent
Gregg

(10) Patent No.: US 7,976,038 B2
(45) Date of Patent: Jul. 12, 2011

(54) TRAILING ARM VEHICLE SUSPENSION SYSTEM

(75) Inventor: John Stuart Gregg, Summerland (CA)

(73) Assignee: Peerless Limited, Penticton, British Columbia (CA)

( * ) Notice: Subject to any disclaimer, the term of this patent is extended or adjusted under 35 U.S.C. 154(b) by 16 days.

(21) Appl. No.: 12/476,812

(22) Filed: Jun. 2, 2009

(65) Prior Publication Data

US 2009/0302567 A1   Dec. 10, 2009

Related U.S. Application Data

(60) Provisional application No. 61/058,503, filed on Jun. 3, 2008, provisional application No. 61/110,114, filed on Oct. 31, 2008.

(51) Int. Cl.
    *B60G 21/05*    (2006.01)
(52) U.S. Cl. .................................. 280/124.128
(58) Field of Classification Search ........... 280/124.106, 280/124.107, 124.116, 124.128, 124.137, 280/124.149
See application file for complete search history.

(56) References Cited

U.S. PATENT DOCUMENTS

| | | | |
|---|---|---|---|
| 5,924,712 A * | 7/1999 | Pierce | 280/124.13 |
| 6,607,205 B2 * | 8/2003 | Platner | 280/124.116 |
| 6,672,605 B2 * | 1/2004 | Basnett | 280/124.128 |
| 6,808,192 B1 * | 10/2004 | Bol | 280/124.116 |
| 7,077,410 B2 * | 7/2006 | Gregg et al. | 280/124.13 |
| 7,234,713 B1 * | 6/2007 | Kooi et al. | 280/124.106 |
| 7,331,588 B2 | 2/2008 | Johnson | |

* cited by examiner

*Primary Examiner* — Paul N Dickson
*Assistant Examiner* — Robert A Coker
(74) *Attorney, Agent, or Firm* — Sheema Khan; Miltons IP/p.i.

(57) ABSTRACT

A duplex trailing arm chassis support system has two longitudinal trailing arm members disposed on respective sides of the vehicle chassis and a structurally connecting cross member joining the two trailing arms to couple the movement of the two respective arms. Resilient cushioning members extend between each of the trailing arms and the underside of the vehicle chassis or between the connecting member and the vehicle chassis to provide resilient support to the vehicle chassis. Each trailing arm carries a wheel axle having wheels on both ends of the axle, each of the wheel axles being pivotally mounted to its respective trailing arm for rotational movement about the longitudinal axis of the trailing arm, allowing the axles to rock from side to side.

13 Claims, 10 Drawing Sheets

TRAILING ARM VEHICLE SUSPENSION SYSTEM

TECHNICAL FIELD OF THE INVENTION

This invention relates to a suspension for vehicles. More particularly, it relates to a trailing arm suspension for a pair of axles on a trailer. This invention claims priority from U.S. provisional patent applications 61/058,503 filed Jun. 3, 2008 and 61/110,114 filed Oct. 31, 2008. The contents of that priority documents are adopted herein in their entirety.

BACKGROUND TO THE INVENTION

This invention applies to vehicle suspensions for free rolling axles (non-driving axles). More specifically this suspension may be preferably used with axles that are arranged in multiple axle clusters. These clusters can have two axle assemblies mounted laterally displaced from each other across the width of the vehicle, and one or more (typically 2, 3, or 4) lines of such axles mounted along the length of the vehicle. In most cases the vehicle is a trailer, but may also be a powered vehicle with auxiliary free rolling axles.

Similar art in the field is listed as follows.
References U.S. Patents
U.S. Pat. No. 4,166,640—Van Denberg—Turner suspension with "Tri-Functional" pivot bushing.
U.S. Pat. No. 4,732,407—Oyama—Fuji use of variable rate bushing.
U.S. Pat. No. 5,037,126—Gottschalk—Boler (Hendrickson) trailing arm construction.
U.S. Pat. No. 5,996,981—Dilling—Boler (Hendrickson) narrow bushing.
U.S. Pat. No. 7,108,270—Smith—Cantilever axle suspension, non roll linked.
U.S. Pat. No. 6,142,496—Bartel—Cantilever axle suspension, roll linked.
U.S. Pat. No. 6,286,857—Reese, et al—Trunnion axle suspension.
U.S. Pat. No. 7,077,410—Gregg, et al—Trunnion axle suspension In preferred applications, this type of suspension utilizes "air springs" to support the load carried by the trailer chassis frame with pneumatic pressure. The air springs also deflect to absorb bumps and uneven road surfaces. Air springs bring the advantage that their spring schedule may be adjusted, allowing for customization of clearance and reaction characteristics. Interconnecting the air springs for groups of axles with pneumatic hose or pipe allows equal pressure to be applied to groups of axles, permitting the load on each axle within the connected group to carry a relatively equal portion of the total load (axle equalization). Alternative types of resilient cushioning members may be used in place of the air springs. These could include, but are not limited to, hydraulic cylinders, hydraulic cylinders with gas charged accumulators, elastomeric cushions, steel springs, or combinations of spring types.

This invention particularly and preferably relates to multi-wheel axles carried by a trailing arm suspension that permits an axle to rotate to a limited degree about the longitudinal axis of the trailing arm. This is desirable in order to maintain ground contact and equal wheel loading for the wheels on both ends of the individual axle. A trailing arm of such a suspension is also pivotally attached to the vehicle chassis frame such that the pivot joint allows the trailing arm to rotate in a vertical plane, thus allowing the wheel axle to rise and fall according to irregularities in the road surface. The springs positioned between the trailing arm and the chassis frame remote from the trailing arm pivot joint limit the degree of trailing arm rotation in the vertical plane as well as providing support to the chassis frame.

While the ability of the trailing arm to swing in a vertical plane allows the wheel axle to move upward and downward with respect to the vehicle frame, there is a need in such vehicle suspensions to provide resistance to lateral deflections of the trailing arm. Prior art suspensions have used either a heavy duty resilient compound trunnion pivot (Gregg, et al—U.S. Pat. No. 7,077,410), or a sliding guide at the rear end of the trailing arm (Reese, et al—U.S. Pat. No. 6,286,857), or a Panhard Rod to resist lateral deflection. These lateral forces may be significant as they are caused by centrifugal turning forces, the lateral component of gravitational forces when the vehicle is on banked surfaces and, most significantly, the lateral wheel skid force created when a cluster of axles distributed along the length of the vehicle frame is exposed to turning forces. During turning the forward axles in the cluster must skid toward the inside of the turn, while the rear axles skid toward the outside of the turn. These "skid steer" forces are relatively high due to the coefficient of friction of the tires (grip) and irregularities (ruts) in the road surface. Accordingly, there is a need for a trailing arm to resist excessive lateral deflections of such arm, out of alignment with the vehicle longitudinal axis, without necessarily incurring the relative complexity of a resilient trunnion pivot or the increased suspension construction and maintenance costs usually associated with sliding guide and Panhard Rod based designs.

There is also a need for a suspension to resist lateral roll or sway of the vehicle frame or chassis to which it is mounted. To resist such lateral roll or sway of the chassis, a relatively parallel alignment of the right and left side trailing arms should be maintained. This is the function of a typical anti-sway bar, when employed. However, in many prior art suspensions systems such supplementary anti-roll features are not provided. As a result roll stability is primarily the function of the suspension spring rate (spring stiffness) and lateral trailing arm spacing (stance), thus these suspensions tend to have low roll stability.

In this context, there is a need for an improved arrangement for limiting undesired deflections in a trailing arm, while permitting the desired degree of flexibility. This invention addresses that objective.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

According to one aspect of the invention a pair of trailing arms connected to the underside of a vehicle frame through respective preferably compliant pivoting couplings is provided with a connecting member which rigidly links a right side trailing arm (with its own axle and wheel set) to a laterally located and generally aligned left side trailing arm (with its axle and wheel set). This connecting member, in linking the right and left trailing arms of a trailing arm suspension, communicates a resisting force to one rotating trailing arm when the other tends to move, effectively forming a substantially unitary duplex trailing arm assembly.

According to a further aspect of the invention, a vehicle chassis suspension for free rolling axles is provided by:

a) first and second trailing arms, each pivotally mounted to a vehicle chassis through a pivot mount having a pivot axis that is aligned generally horizontally and perpendicularly to the vehicle centerline, such trailing arm being connected to the vehicle chassis at the root end of the trailing arm, the respective trailing arms each being displaced laterally from one another on a respective side of the vehicle centerline;

b) a resilient cushioning member connected between the underside of the vehicle chassis and each trailing arm for the support of the vehicle frame and the filtering of shock energy transmitted from the trailing arm to the chassis.

c) a pair of wheel axles respectively pivotally mounted to the first and second trailing arms at a point remote from the trailing arm pivot mount, the pivot axes of the axles about the trailing arms being aligned longitudinally with the length of each respective trailing arm;

d) one or more road wheels rotatably connected at each end of each axle, and e) a connecting member attached to both the first and second trailing arms whereby, upon rotation of a trailing arm about its trailing arm pivot axis, the connecting member communicates a resisting moment to said rotating trailing arm originating from the other trailing arm.

Preferably, the connecting member is rigidly fixed to the respective trailing arms and more preferably is formed as a unitary element with respect to the trailing arms.

According to one variant, the connecting member may connect to the respective trailing arms by being fastened laterally to the side of the trailing arms close to the pivot joint or laterally in line with the pivot axis of the trailing arm. According to another variant, the connecting member may connect to the respective two trailing arms at the forward end of the trailing arms, forwardly of the pivot joint. According to still another variant, the connecting member may connect to the respective two trailing arms towards or at the trailing end of the trailing arms. In appropriate cases the respective trailing arms and the connecting member may be formed in one piece, preferably, of bent tubing.

This connecting member performs several functions. The connecting member of the invention resists lateral deflection of the right and left trailing arms that would be caused by the lateral forces imposed on the axles by relaying these forces to couples that are opposed by the pivot bearings. Due to the connection between the connecting member and the respective trailing arms, any tendency for a single trailing arm to be displaced laterally will be resisted by the lateral stiffness of the pivot bearings of both trailing arms. This reduces the stress on the respective pivot bearings.

Such a connecting member also serves to resist any tendency for rotation of the right and left trailing arms about their respective longitudinal axes. Such a tendency may arise from the rotation of the axles about a trailing arm longitudinal axis due to an irregular road surface and from rotational resistance within the axle seat bearing members. Any tendency for such a longitudinal rotation to occur within one trailing arm is met and opposed by the pivot bearings of both trailing arms through the coupling of the connecting member. This also reduces the stress on the respective pivot bearings.

The connecting member further provides anti-roll stiffness to the vehicle chassis as the elevation of one trailing arm axle relative to the vehicle chassis will tend to create a substantially similar elevation of the laterally adjacent trailing arm axle relative to the vehicle chassis, thus maintaining the axles of each side of the vehicle in relative level alignment with the vehicle chassis, and thus restricting the tendency of the vehicle to cant sideways due to differential lateral suspension deflection.

According to the invention, the connecting member, while resilient, is of sufficient strength and stiffness to resist the bending and torsional loads imposed on it and to distribute these forces in the form of a couple that is applied to the respective suspension pivot mounts. A significant benefit of this design over previous designs arises from its inherent anti-roll properties together with its efficient resistance to lateral axle movement using fewer active components, such as pivot trunnions or sliding arm guides.

According to a preferred variant, the pivot bearing components for each trailing arm include one or more pivot shafts within pivot hangers that are attached to the vehicle frame with a rotating pivot bearing housing fixed to the end of the trailing arm. Alternate designs may, at the discretion of the designer, have the pivot bearing components reversed from the preferred embodiment. In this case the bearing housings may be attached to the vehicle chassis with rotating pivot shafts attached to the associated trailing arms. The pivot bearing may also be in the form of trunnions carried by a trailing arm that engage with seats carried on the underside of the vehicle chassis.

According to a further variant of the invention, the connecting member is connected to the trailing arm remotely from the trailing arm pivot, on the other side of the air springs or similar resilient means from the trailing arm pivot, beyond or at the point of connection of the air springs with the trailing arm. The connecting member in such case may be a continuous extension of the respective trailing arms on both sides of the vehicle chassis, or maybe an independent piece which is joined to each respective trailing arm. The air springs in such cases may either bear directly on each respective trailing arm or on a portion of the connecting member. Additionally, or as a further alternative, in place of the usual two air springs bearing on the trailing arms, a single larger capacity spring or multiple springs may be connected between the connecting member and the vehicle chassis whereby the spring forces are communicated by the connecting member to the trailing arms in equal proportion.

The foregoing summarizes the principal features of the invention and some of its optional aspects. The invention may be further understood by the description of the preferred embodiments, in conjunction with the drawings, which now follow.

Wherever ranges of values are referenced within this specification, sub-ranges therein are intended to be included within the scope of the invention unless otherwise indicated. Where characteristics are attributed to one or another variant of the invention, unless otherwise indicated, such characteristics are intended to apply to all other variants of the invention where such characteristics are appropriate or compatible with such other variants.

Wherever features are disclosed which can function concurrently, in cooperation with or synergistically with other features to provide a useful effect, such combinations may also be adopted as variations on the invention.

BRIEF DESCRIPTION OF THE DRAWINGS

The drawings which are attached depict the following.

DESCRIPTION OF THE PREFERRED EMBODIMENT

Figure 1:
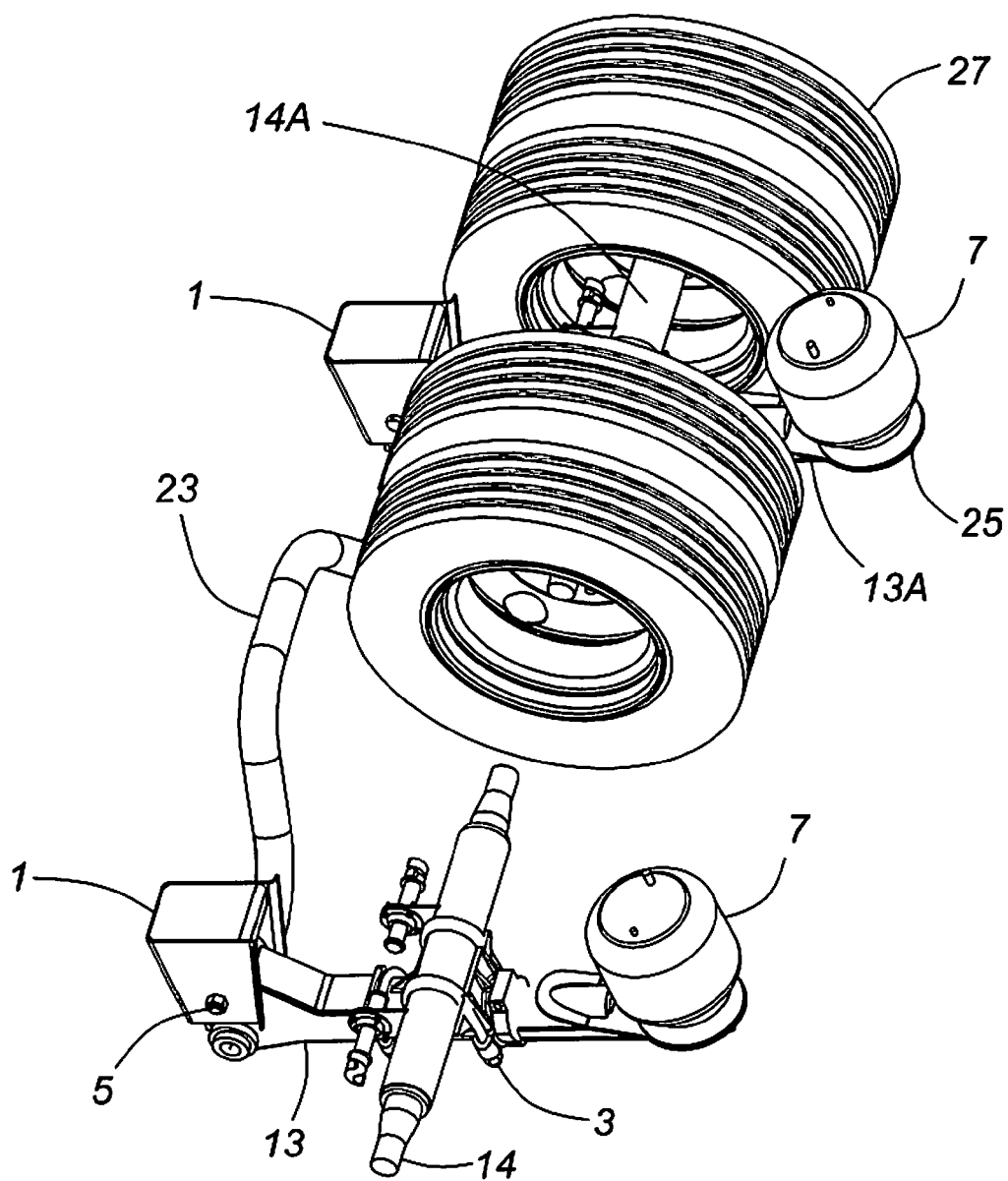
FIG. 1 is a pictorial depiction of a duplex trailing arm suspension assembly with air springs according to the invention, with one set of wheels present on a first axle, and with wheels removed for better view on the second axle.
Figure 2:
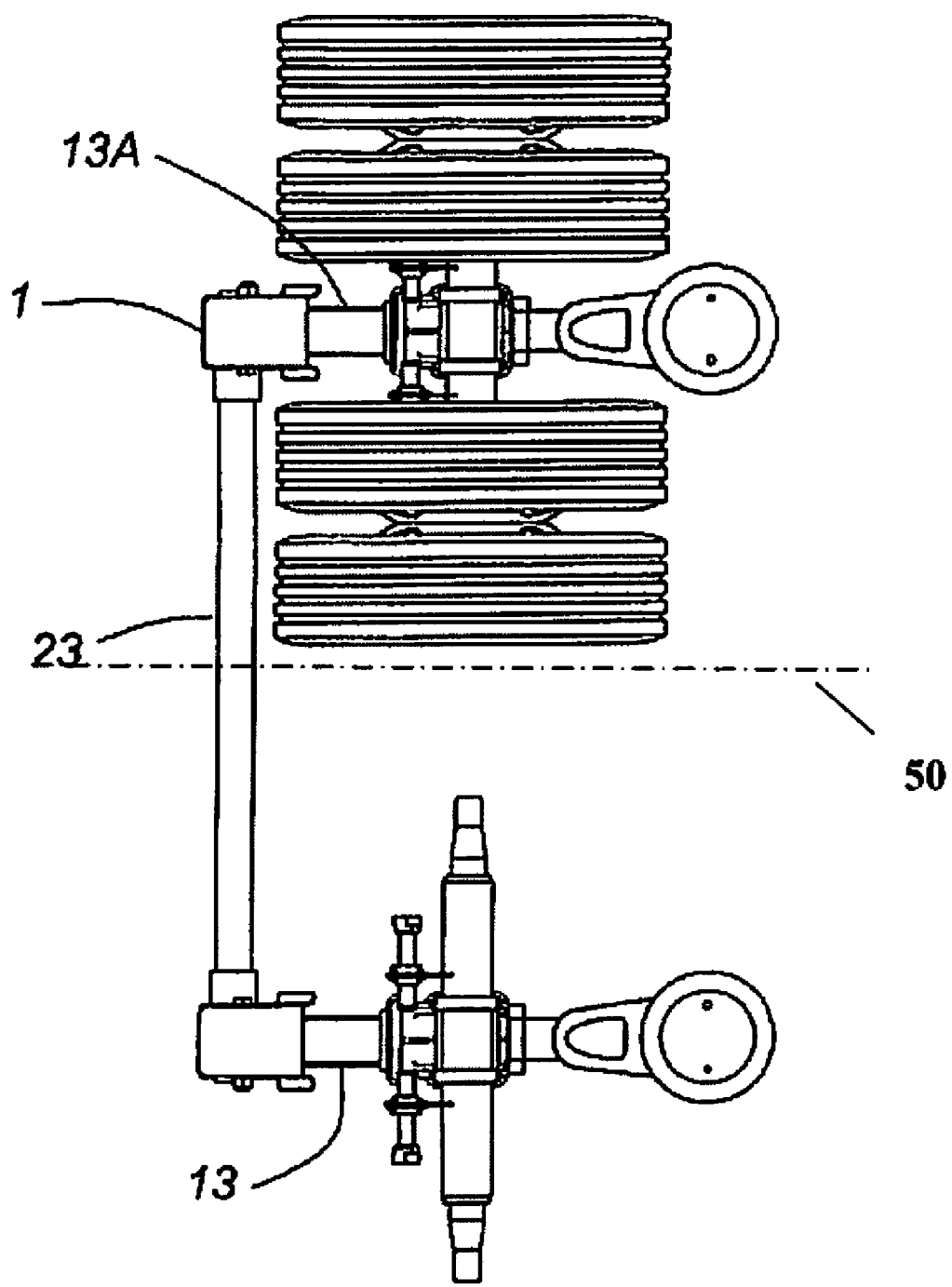
FIG. 2 is a plan view of the suspension of FIG. 1.
Figure 3:
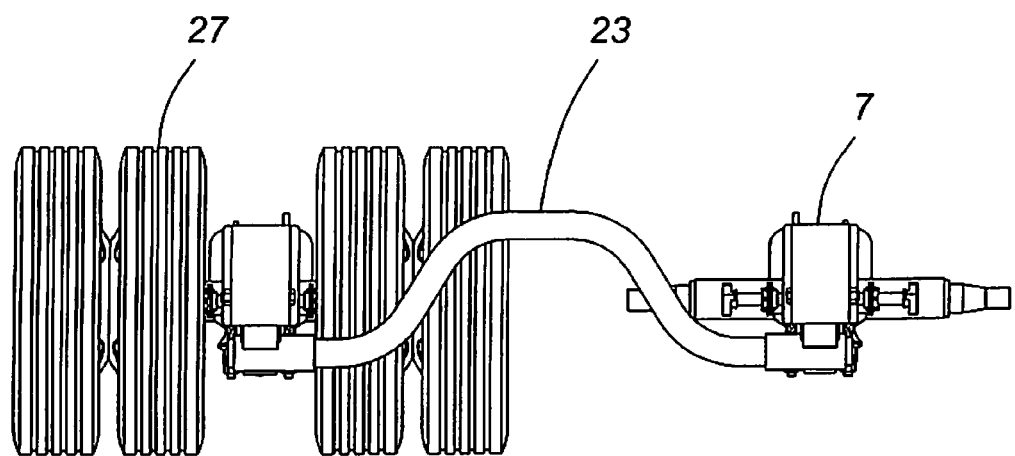
FIG. 3 is an end view of the suspension of FIG. 1 looking along the longitudinal axis of a vehicle chassis.
Figure 4:
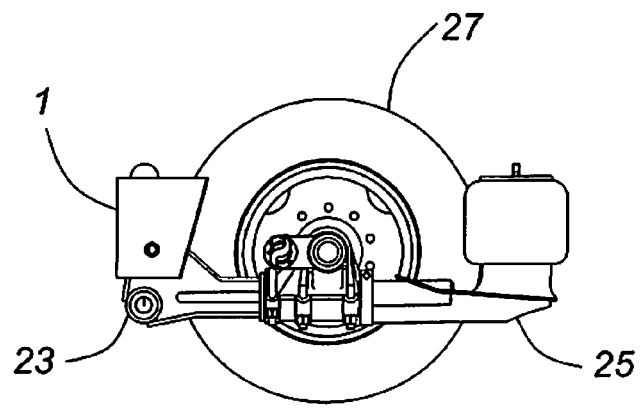
FIG. 4 is a side view of the suspension of FIG. 1 taken from the side with wheels removed.
Figure 5:
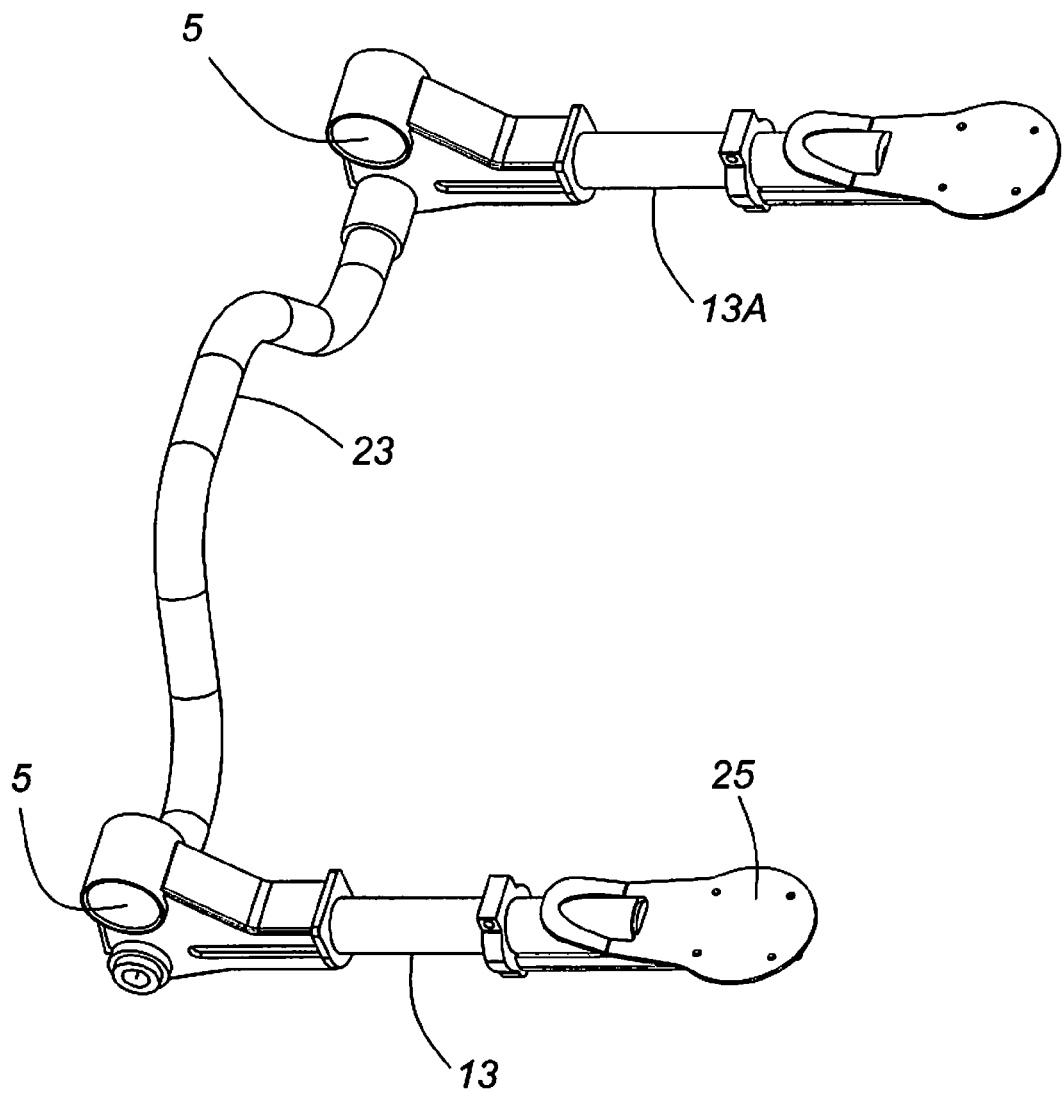
FIG. 5 is a pictorial depiction of the variant of FIG. 1 with all axles and wheels removed, showing the connecting member in bent form.
Figure 6:
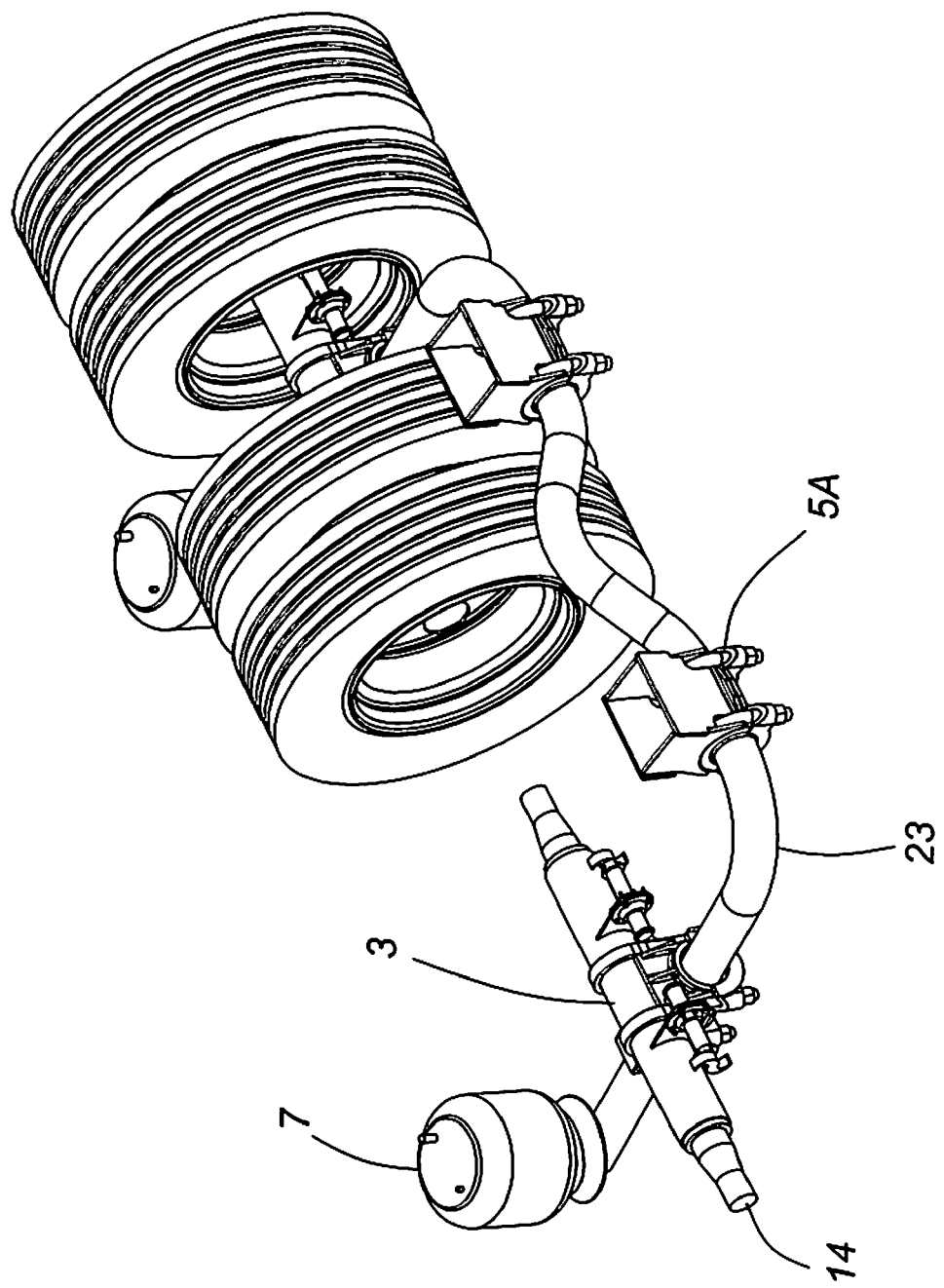
FIG. 6 is a pictorial depiction as in FIG. 1 of a variant wherein the connecting member couples to the respective trailing arms along the longitudinal axis of the respective trailing arms and is then bent transversely to provide a common pivot for both trailing arms.
Figure 7:
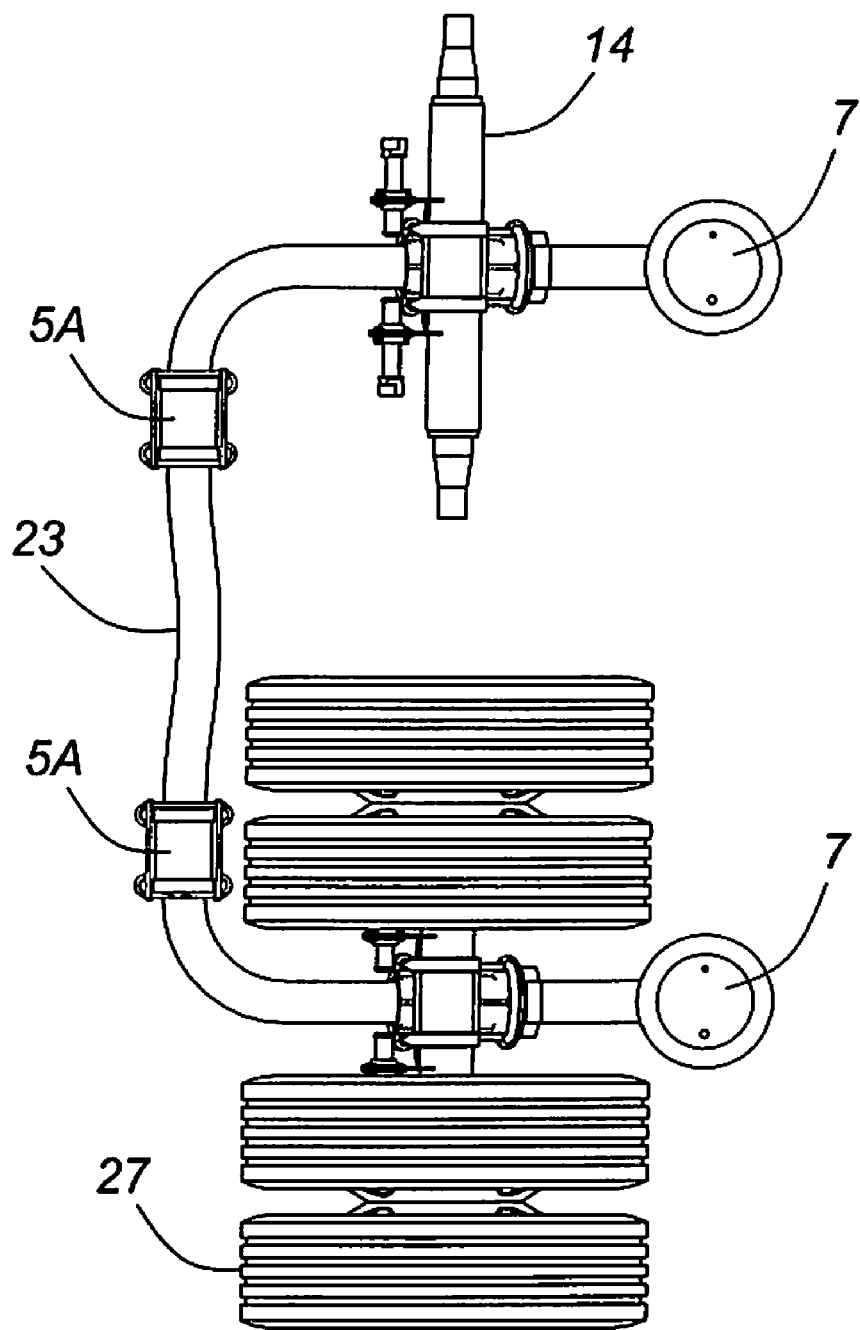
FIG. 7 is a plan view of the suspension of FIG. 6.
Figure 8:
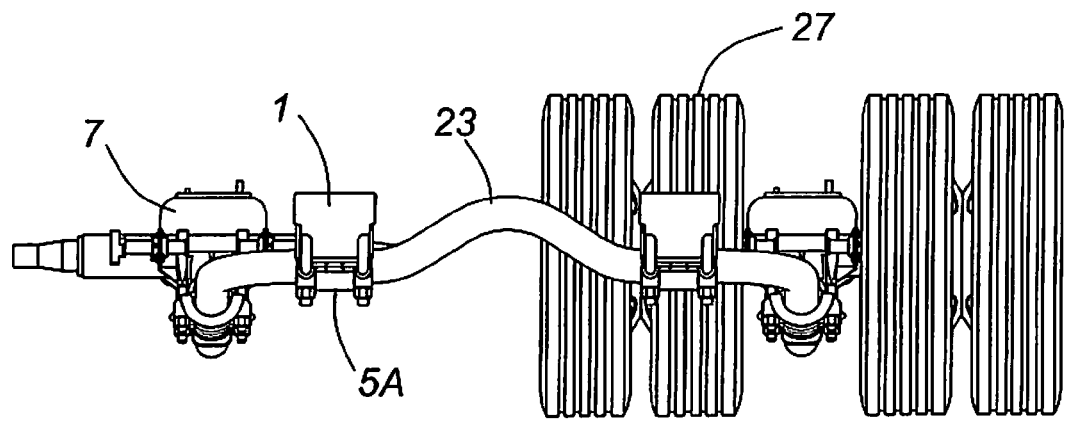
FIG. 8 is an end view of the suspension of FIG. 6 looking along the longitudinal axis of a vehicle chassis.
Figure 9:
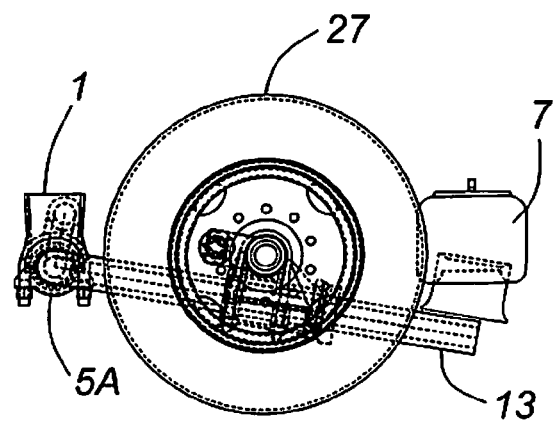
FIG. 9 is a side view of the suspension of FIG. 6 taken from the side with wheels removed.

As shown in FIGS. 1-5 a pair of trailing arms 13, 13A are respectively connected to the underside of a vehicle frame (not shown) at their root ends through respective, generally compliant pivot mounts 5 and pivot hangers 1. Each pivot mount 5 has a pivot axis that is aligned generally horizontally and perpendicularly to the vehicle centerline 50

These pivot mounts 5 each preferably include an elastomeric bushing which allows rotational movement of the connected trailing arm 13, 13A in a vertical plane about the pivot axis of the pivot mount 5, while allowing a small degree of rotational movement about other axes perpendicular to the pivot axis. The compliance provided by these elastomeric bushings only permits small radial movements of the trailing arms 13, 13A relative to the pivot axis of the pivot mounts 5 within the elastic limits of the bearing material.

The respective trailing arms 13, 13A are each displaced laterally from one another on a respective side of the vehicle centerline 50 with their respective pivot axles in alignment. Air springs 7 are positioned between the respective trailing arms 13, 13A and the vehicle chassis. The air springs 7 rest on air spring support pads 25 which form part of the trailing arm 13, 13A.

Each of the wheel axles 14, 14A is respectively mounted to the first and second trailing arms 13, 13A at points remote from the trailing arm pivot mounts 5 through an axle coupling 3 that allows a limited degree of rotation of the wheel axles 14, 14A about the longitudinal axes of the trailing arms 13, 13A. Optionally, the trailing arm to axle coupling 3 may comprise elastomeric material in the form of a bushing whereby limited amounts of pivotal, radial and axial movements of the trailing arms 13, 13A are accommodated by deflection of the elastomeric material, and in this case it is preferable that such elastomeric material present a greater resistance to lateral motion of the attached axles than to vertical teetering motions. These rotational axes are aligned with the longitudinal lengths of the respective trailing arms 13, 13A, and very generally, longitudinally and parallel to the centerline 50 of the vehicle.

A connecting member 23 rigidly links a right side trailing arm 13A (with its own axle 14A and wheel set 27) to a laterally located and generally aligned left side trailing arm 13 (with its own axle 14 and wheel set—not shown). This connecting member 23 in linking the right and left trailing arms 13, 13A of a trailing arm suspension effectively forms a substantially unitary duplex trailing arm assembly.

The connecting member 23 acts so that, upon a tendency for rotation of one trailing arm 13, 13A about its pivot mount 5 and trailing arm pivoting axis, the connecting member 23, being connected to the other trailing arm 13, 13A, communicates a resisting moment to such 1st rotating trailing arm 13, 13A, which resists its tendency to rotate. This resisting moment originates from the other trailing arm 13, 13A. This transferred moment reduces the tendency of the vehicle chassis and associated load to roll with respect to the wheel sets.

The connecting member 23 is rigidly fixed to the respective trailing arms 13, 13A at any point along the lengths of such trailing arms 13, 13A. The preferred connection between the connecting member 23 and the trailing arms 13, 13A is substantially rigid, a unitary design being desirable, followed by a welded, bolted, dowelled, clamped etc. connection. The respective trailing arms 13, 13A and the connecting member 23 are preferably respectively formed of bent tubing but may be made of any structurally adequate material, preferably steel.

Figure 10:
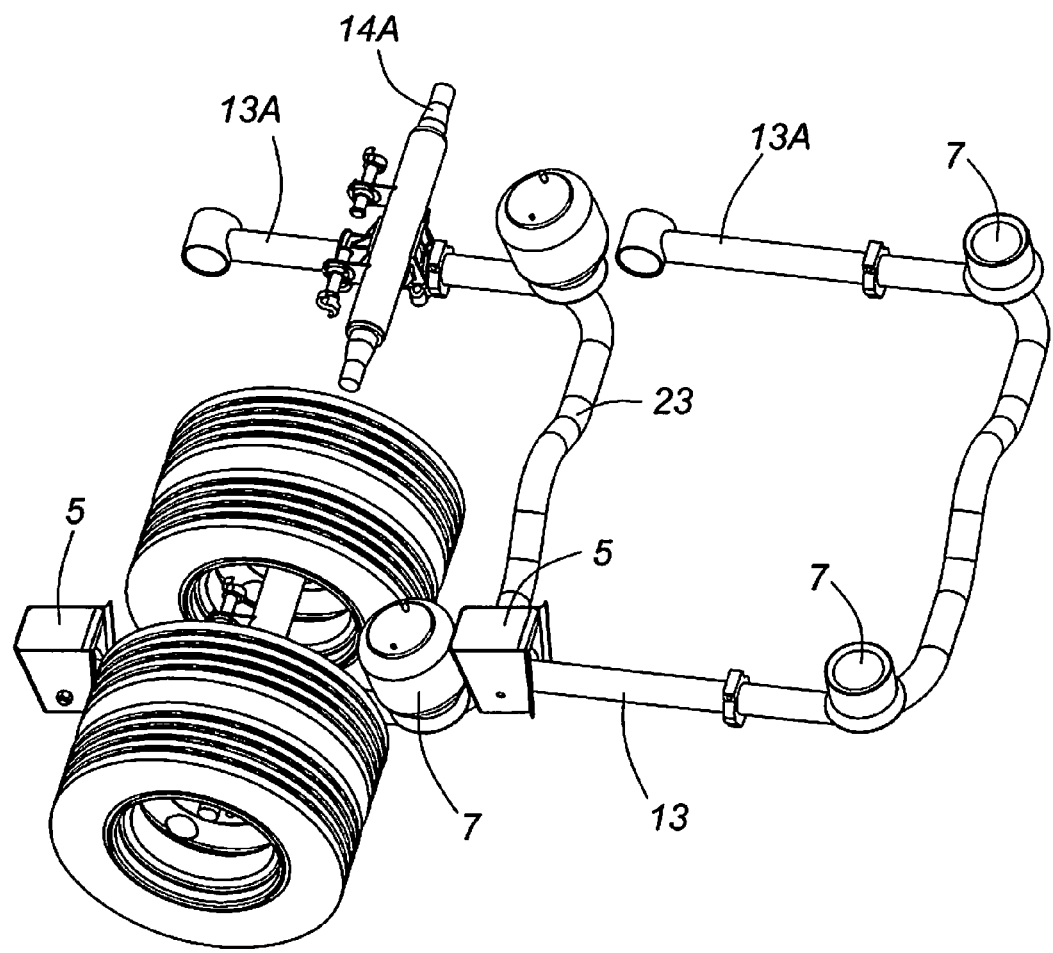
FIG. 10 is a perspective view of two connecting members for two sets of pairs of laterally aligned, multi-wheel axles wherein the connecting members are each a continuous extension of the respective trailing arms on both sides of the vehicle chassis and the air springs bear on the trailing arm at the points of connection with the connecting member.
Figure 10A:
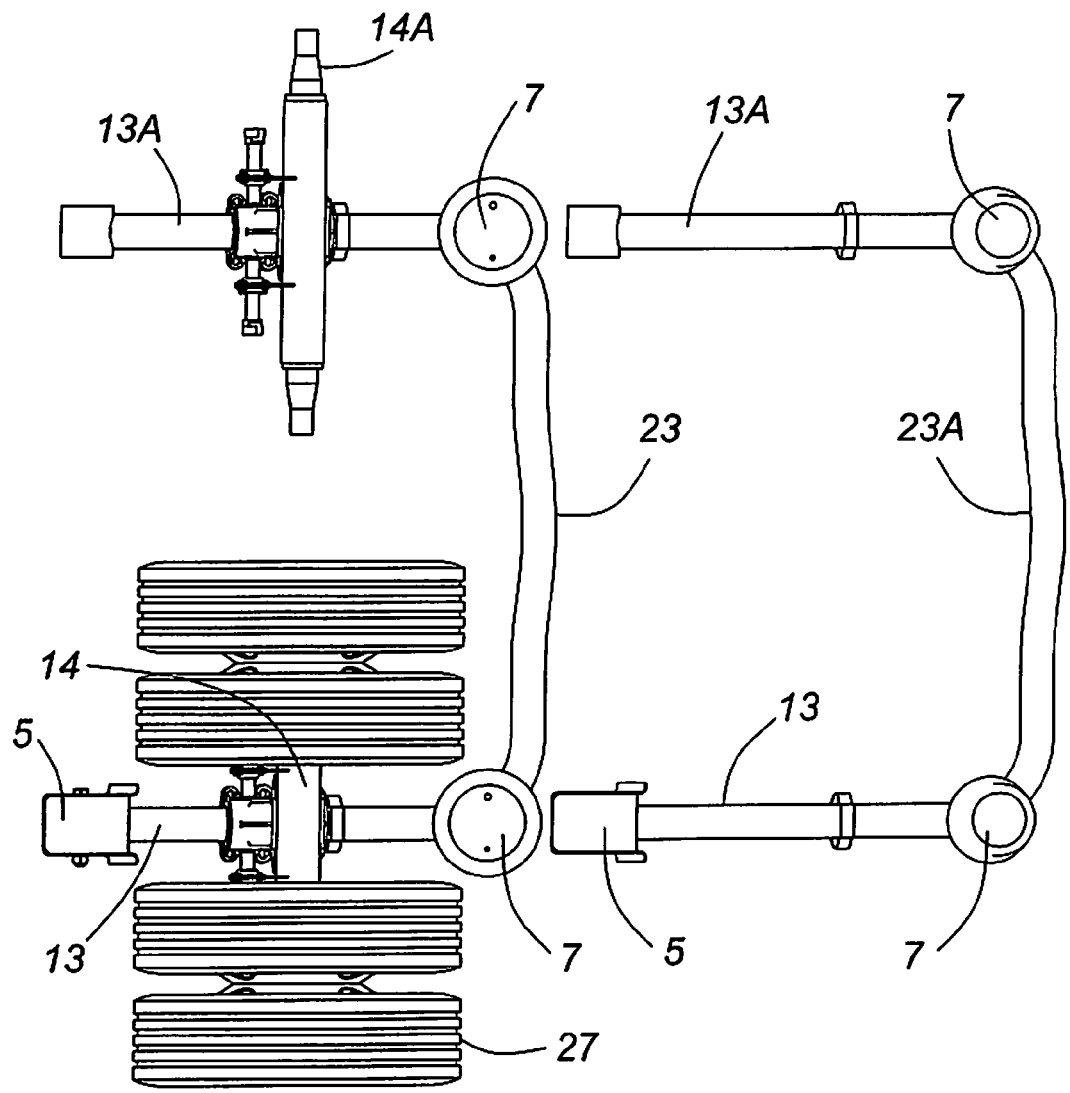
FIGS. 10A, 10B, and 10C are respectively plan, end and side views of the trailer suspension configuration of FIG. 10.
Figure 10B:
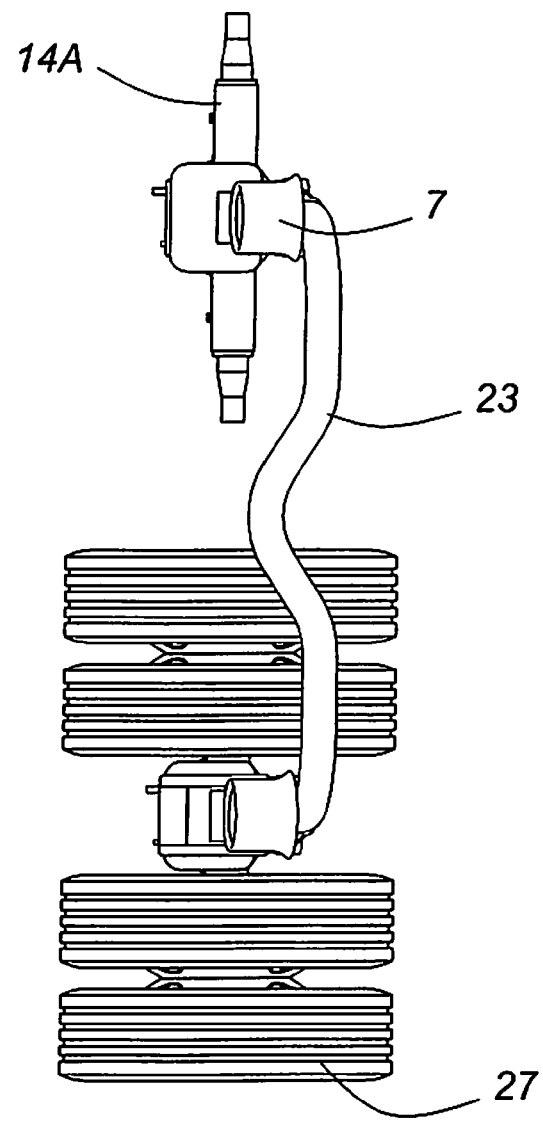
Figure 10C:
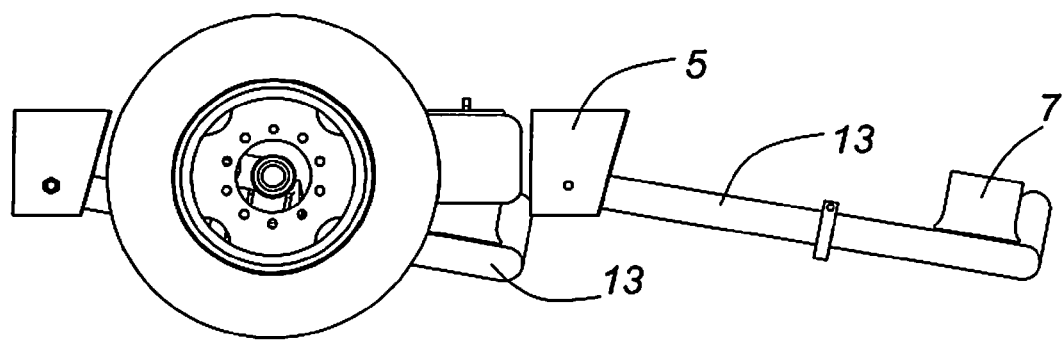

The connecting member 23 may connect to the respective trailing arms 13, 13A by being fastened laterally to the side of the trailing arms 13, 13A close to the pivot mount 5, and even laterally in line with the pivot axis of the pivot mount 5 provided that a sufficiently rigid connection is effected. The connecting member 23 may connect to the respective two trailing arms 13, 13A at the trailing end of the trailing arms 13, 13A, as shown in FIGS. 10-10C, being bent so as to be routed around intervening components such as an air spring 7.

The connecting member 23 may alternately connect to the respective two trailing arms 13, 13A at the forward end of the trailing arms, forwardly of the pivot mount 5. While such a connection may be affected laterally, the connecting member 23 may connect initially as a forward longitudinal extension of the trailing arms 13, 13A. This alternative is shown FIGS. 6-9. In this case, the respective trailing arms 13, 13A and the connecting member 23 may be conveniently, respectively formed of a single, unitary bent tubing as depicted in FIGS. 6-9.

While not depicted, a single larger capacity spring may be connected to the center of the connecting member 23 in the configuration as shown FIGS. 6-9. This single spring may be supplemental to or may serve in place of the two separate air springs 7. Such a central spring can be positioned to ensure that the spring forces it generates are communicated by the connecting member 23 to the trailing arms 13, 13A in equal proportion. As an alternative to a single central spring, multiple springs 7 may be placed in the alternate position between the connecting member 23 and the vehicle chassis.

As shown in FIGS. 6-9 the connecting member 23 may serve as part of an alternate pivot mount 5A for supporting the respective trailing arms 13, 13A. In this case the pivot mounts 5A are fitted into pivot hangers 1 that are attached to the underside of the vehicle chassis permitting the respective trailing arms 13, 13A to pivot about the co-aligned pivot axes of the pivot mounts 5A.

The connecting member 23 can be straight or bent or any shape as long as it creates sufficient structural stiffness to communicate the suspension forces from one trailing arm 13, 13A to the other and thus from one pivot connection 5, 5A to the other. In particular the connecting member 23 is shown as being bent in FIGS. 1, 3 in a form to facilitate clearance for removal of the inboard wheels on multiple axle groups where the wheels must be removed towards the front or rear of the vehicle, e.g. trailer, chassis. The connecting member 23 may also be bent or formed to extend the length of material comprising it, in order to achieve a specifically desired degree of resistance to deflection and control the characteristics of force transfer between the trailing arms 13 and 13A.

In FIGS. 10, 10A, 10B, and 10C a first pair of aligned multiwheel axles 14, 14A are depicted as being carried on respective trailing arm portions 13, 13A joined by a first connecting member 23. Additionally, a second connecting member 23A (only) is depicted as following the first in the location where it would be present on a multiwheel vehicle chassis. In these figures the connecting member 23 is a continuous extension of the respective trailing arms 13, 13A on both sides of the vehicle chassis. As such, the connecting member portion 23 is connected to each respective trailing arm 13, 13A remotely from the respective trailing arm pivot mount 5 at a point at or beyond where the respective air springs 7 positioned against the vehicle chassis bear on each trailing arm 13, 13A. A connecting member 23, 23A as it traverses between the respective trailing arms 13, 13A may be optionally bent upwardly or otherwise to provide ground clearance, to accommodate the shape of the vehicle chassis or for the convenience of access as described earlier.

While not depicted, a single larger capacity spring may be connected to the center of the connecting member 23 in place of the two separate air springs 7. Such a central spring can be positioned to ensure that the spring forces it generates are communicated by the connecting member 23 to the trailing arms 13, 13A in equal proportion. As an alternative to a single central spring, multiple springs may be placed between the connecting member 23 and the vehicle chassis.

The presence of the connecting member 23 provides anti-roll stiffness while maintaining alignment of the axles 14, 14A with the vehicle chassis without the need for additional pivot connections, bumpers or guides. This reduces the number of functional components. The degree of anti-roll stiffness may be adjusted through the selection of the cross-section of connecting member 23 to control its stiffness as well as selection of resilient pivot mounts 5, 5A for varying degrees of compliance.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit with the invention and the disclosure that has been provided herein.

I claim:

1. A vehicle chassis suspension for free rolling axles comprising:
  a) first and second trailing arms, each pivotally mounted to a vehicle frame through a pivot mount having a pivot axis that is aligned generally horizontally and perpendicularly to a vehicle chassis centerline, such trailing arms being connected to the pivot mount at a root end, the respective trailing arms each being displaced laterally from one another on a respective side of the vehicle chassis centerline;
  b) a resilient cushioning member or members connected between an underside of a vehicle chassis and a point on each trailing arm located at a position or positions remote from each of the trailing arm pivot axes, for the support of the vehicle frame and the filtering of shock energy transmitted from the trailing arm to the chassis;
  c) a pair of wheel axles respectively pivotally mounted to the first and second trailing arms at a point remote from the trailing arm pivot mount, pivot axes of the axles about the trailing arms being aligned longitudinally with the length of each respective trailing arm;
  d) one or more road wheels rotatably connected at each end of each axle, and
  e) a connecting member attached to both the first and second trailing arms
  whereby, upon either rotation of a trailing arm about its trailing arm pivot axis or rotation of a trailing arm in any direction other than that allowed by its trailing arm pivot axis, the connecting member communicates a resisting force to said rotating trailing arm originating from the other trailing arm.

2. A vehicle suspension as defined in claim 1 wherein the resilient cushioning member or members are in the form of one or more respective air springs that are respectively coupled between the vehicle chassis and the respective trailing arms.

3. A vehicle suspension as defined in claim 1 wherein the first trailing arm, the second trailing arm and the connecting member are unitary.

4. A vehicle suspension as defined in claim 3 wherein the unitary connecting member forms a pivot shaft of the trailing arm pivot mount.

5. A vehicle suspension as defined in any of claim 1 or 2 wherein the connecting member is connected respectively to the first and second trailing arms at locations on such arms which are forward of the respective pivot mounts.

6. A vehicle suspension as defined in claim 1 wherein the connecting member is connected respectively to the first and second trailing arms at locations on such arms which are substantially at the respective pivot mounts.

7. A vehicle suspension as defined in claim 1 wherein the connecting member is connected respectively to the first and second trailing arms at locations on such arms which are between the respective pivot mounts and axles.

8. A vehicle suspension as defined in claim 1 wherein the connecting member is connected respectively to the first and second trailing arms at locations on such arms which are with respect to the trailing arm pivot mount point, at or further aft of a point of connection between the respective trailing arms and the pair of wheel axles.

9. A vehicle suspension as defined in claim 1 wherein the trailing arm pivot mount comprises an elastomeric bushing, whereby pivotal, radial and axial movements of the trailing arm are accommodated by deflection of the elastomeric bushing.

10. A vehicle suspension as defined in claim 1 wherein the connecting member is bent or formed to extend the length of material comprising it, in order to achieve a specifically desired degree of resistance to deflection and control the characteristics of force transfer between the trailing arms.

11. A vehicle suspension as defined in claim 1 wherein the connecting member has a tubular cross section.

12. A vehicle chassis suspension for free rolling axles comprising:
   a) first and second trailing arms, each pivotally mounted to a vehicle frame through a pivot mount having a pivot axis that is aligned generally horizontally and perpendicularly to a vehicle chassis centerline, such trailing arms being connected to the pivot mount at a root end, the respective trailing arms each being displaced laterally from one another on a respective side of the vehicle chassis centerline;
   b) a resilient cushioning member or members extending from an underside of a vehicle chassis and connected to each trailing arm at a position or positions remote from each of the trailing arm pivot axes, for the support of the vehicle frame and the filtering of shock energy transmitted from the trailing arm to the chassis;
   c) wheel axles respectively mounted to the first and second trailing arms at a point remote from the trailing arm pivot mount;
   d) one or more road wheels rotatably connected at each end of each axle, and
   e) a connecting member attached to both the first and second trailing arms whereby, upon either rotation of a trailing arm about its trailing arm pivot axis or rotation of a trailing arm in any direction other than that allowed by its trailing arm pivot axis, the connecting member communicates a resisting force to said rotating trailing arm originating from the other trailing arm and wherein the connecting member is bent or formed to extend the length of material comprising it, in order to achieve a specifically desired degree of resistance to deflection and control the characteristics of force transfer between the trailing arms.

13. A vehicle chassis suspension for free rolling axles comprising:
   a) first and second trailing arms, each pivotally mounted to a vehicle frame through a pivot mount having a pivot axis that is aligned generally horizontally and perpendicularly to a vehicle chassis centerline, such trailing arms being connected to the pivot mount at a root end, the respective trailing arms each being displaced laterally from one another on a respective side of the vehicle chassis centerline;
   b) a resilient cushioning member or members extending from an underside of a vehicle chassis and connected to each trailing arm at a position or positions remote from each of the trailing arm pivot axes, for the support of the vehicle frame and the filtering of shock energy transmitted from the trailing arm to the chassis;
   c) wheel axles respectively mounted to the first and second trailing arms at a point remote from the trailing arm pivot mount;
   d) one or more road wheels rotatably connected at each end of each axle, and
   e) a connecting member attached to both the first and second trailing arms whereby, upon either rotation of a trailing arm about its trailing arm pivot axis or rotation of a trailing arm in any direction other than that allowed by its trailing arm pivot axis, the connecting member communicates a resisting force to said rotating trailing arm originating from the other trailing arm and wherein the connecting member is connected respectively to the first and second trailing arms at locations on such arms which are between the respective pivot mounts and axles.

* * * * *